United States Patent [19]

Parodi

[11] 4,138,822
[45] Feb. 13, 1979

[54] PORTAL-TYPE PRECISION MEASURING APPARATUS

[75] Inventor: Mario Parodi, Ivrea (Turin), Italy

[73] Assignee: Ing. C. Olivetti & C., S.p.A., Ivrea (Turin), Italy

[21] Appl. No.: 829,900

[22] Filed: Sep. 1, 1977

[30] Foreign Application Priority Data

Sep. 30, 1976 [IT] Italy .............................. 69332 A/76

[51] Int. Cl.² ............................................. G01B 7/28
[52] U.S. Cl. ................................ 33/174 P; 33/174 L; 33/169 R; 33/172 E
[58] Field of Search ............. 33/174 P, 174 Q, 174 R, 33/169 R, 172 E, 174 L

[56] References Cited

U.S. PATENT DOCUMENTS 3,286,353  11/1966  Potter ................................. 33/174 R
3,639,993  2/1972   Sartorio .............................. 33/174 P
3,831,283  8/1974   Pagella et al. ..................... 33/174 R Primary Examiner—R. E. Aegerter
Assistant Examiner—Willis Little
Attorney, Agent, or Firm—Schuyler, Birch, Swindler, McKie & Beckett

[57] ABSTRACT

The precision measuring apparatus comprises a portal mounted to translate on a platform and comprising two uprights supporting a first cross-piece along which runs a carriage bearing a measuring head. The weight of the carriage is unloaded through resilient means on to a second cross-piece disposed parallel to and below the first cross-piece. The second cross-piece is a part of a second portal having two columns translating on the platform together with the first portal. The columns of the second portal are disposed inside the uprights of the first portal, which uprights are hollow, and are moved by the upwriters by means of opposed pairs of compression springs disposed between each column and the corresponding upright.

9 Claims, 9 Drawing Figures

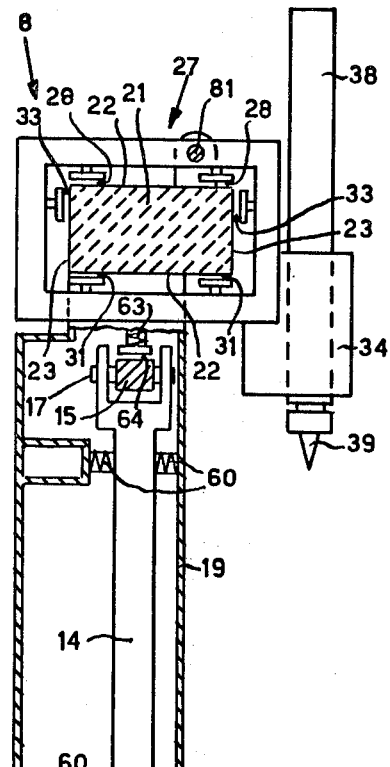
FIG. 2
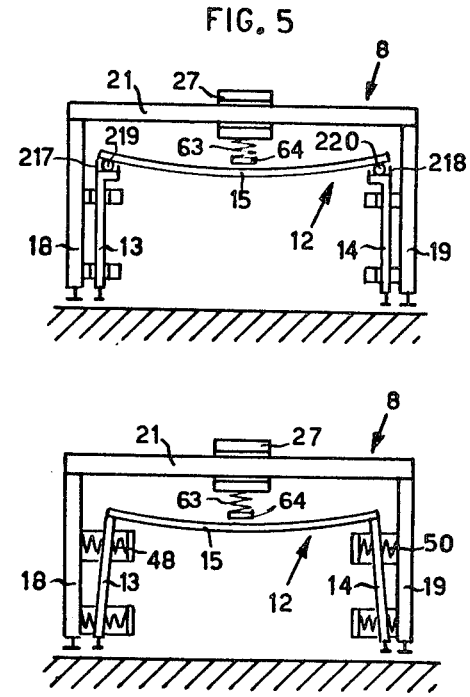
FIG. 5
FIG. 4
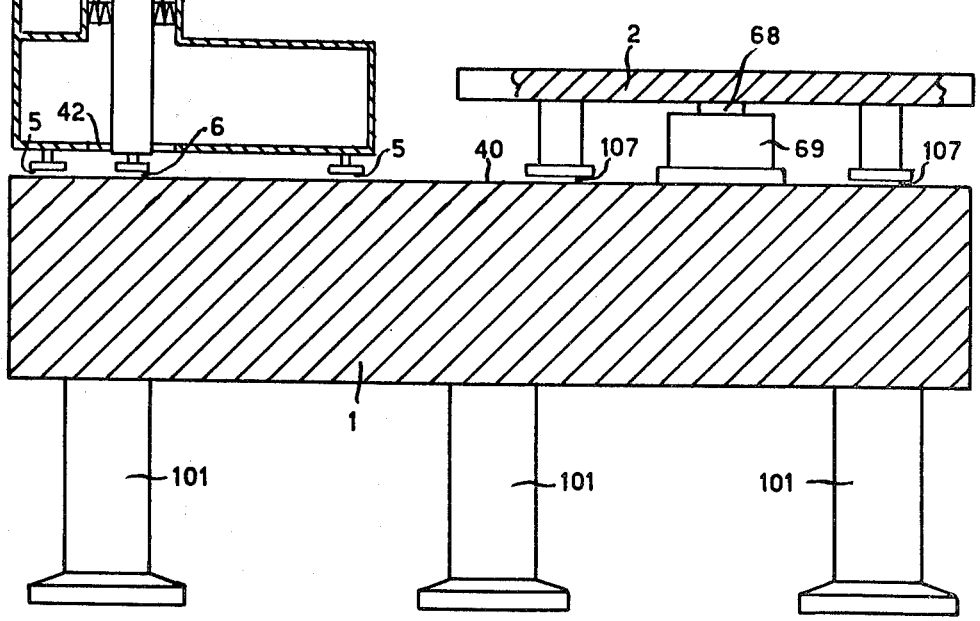

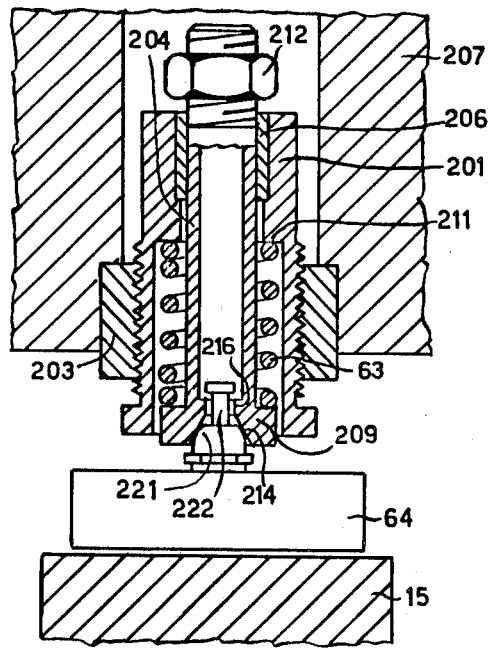
FIG. 6
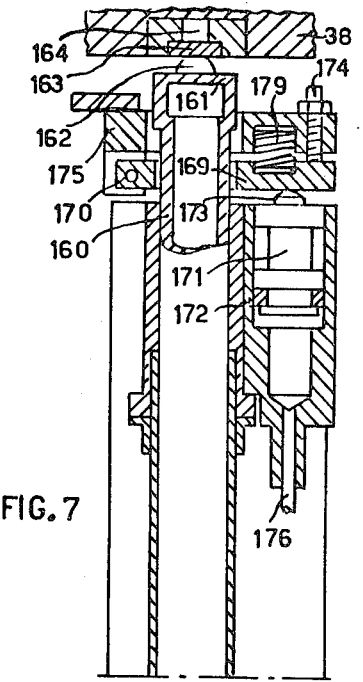
FIG. 7
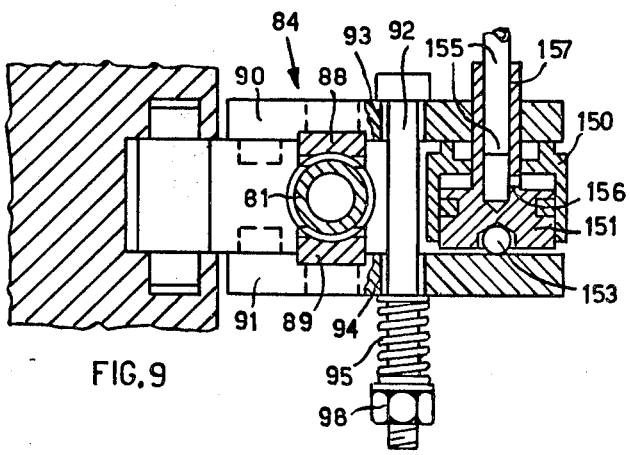
FIG. 9
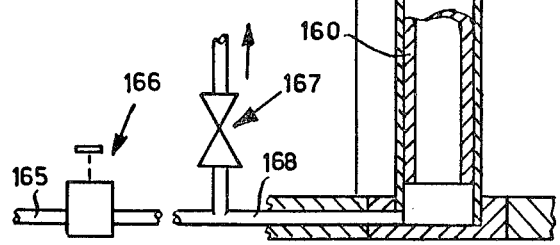

PORTAL-TYPE PRECISION MEASURING APPARATUS

BACKGROUND OF THE INVENTION

The present invention relates to a portal-type precision measuring apparatus, wherein the portal is adapted to translate on a platform and comprises a first cross-piece along which runs a carriage bearing a measuring head, and wherein the weight of the carriage is unloaded through resilient means on to a second cross-piece parallel to the first cross-piece and movable with it.

In a known measuring apparatus (which does not employ a second cross-piece) the deformations produced by the weight of the carriage on the first cross-piece are compensated by acting on the pressure of the air in the supporting bearings of the portal by means of valves controlled, in dependence upon the position of the carriage along the cross-piece, by cams. This solution, however, does not allow exact and complete compensation of the deformations because of the difficulties of reproducing the law of these deformations on the cams. Moreover, this is a relatively costly solution because of the regulating valves.

In another known apparatus, in which the cross-piece is carried by a pair of suitable guides, it has been proposed to unload the weight of the carriage on to a second cross-piece which requires two supplementary guides for the movement thereof. This measuring apparatus, however, is very heavy and costly because of the double guide.

SUMMARY OF THE INVENTION

The object of the present invention is to provide a portal-type precision measuring apparatus without creating bulky guide structures.

According to the present invention there is provided portal-type precision measuring apparatus comprising a portal mounted to translate on a platform and comprising two uprights supporting a first cross-piece along which runs a carriage bearing a measuring head, and wherein the weight of the carriage is unloaded through resilient means on to a second cross-piece parallel to the first cross-piece and movable with it, the second cross-piece being the cross-piece of a second portal having two columns translating on the platform together with the first portal through the medium of air bearings.

BRIEF DESCRIPTION OF THE DRAWINGS

The invention will be described in more detail, by way of example, with reference to the accompanying drawings, wherein:

FIG. 2 is a side view of the measuring apparatus, partly in section, on the line II—II of FIG. 1;

FIG. 4 is a diagram illustrating the deformation of the portal of the measuring apparatus of FIGS. 1 to 3;

FIG. 5 is a diagram illustrating the deformation of a measuring apparatus according to a modified embodiment of the invention;

FIG. 6 is a cross-section of a detail of the measuring apparatus on a larger scale;

FIG. 7 is a vertical section of another detail of the measuring apparatus;

FIG. 9 is a cross-section of a detail of the mechanism of FIG. 8 on a larger scale.

DESCRIPTION OF THE PREFERRED EMBODIMENT

Figure 1:
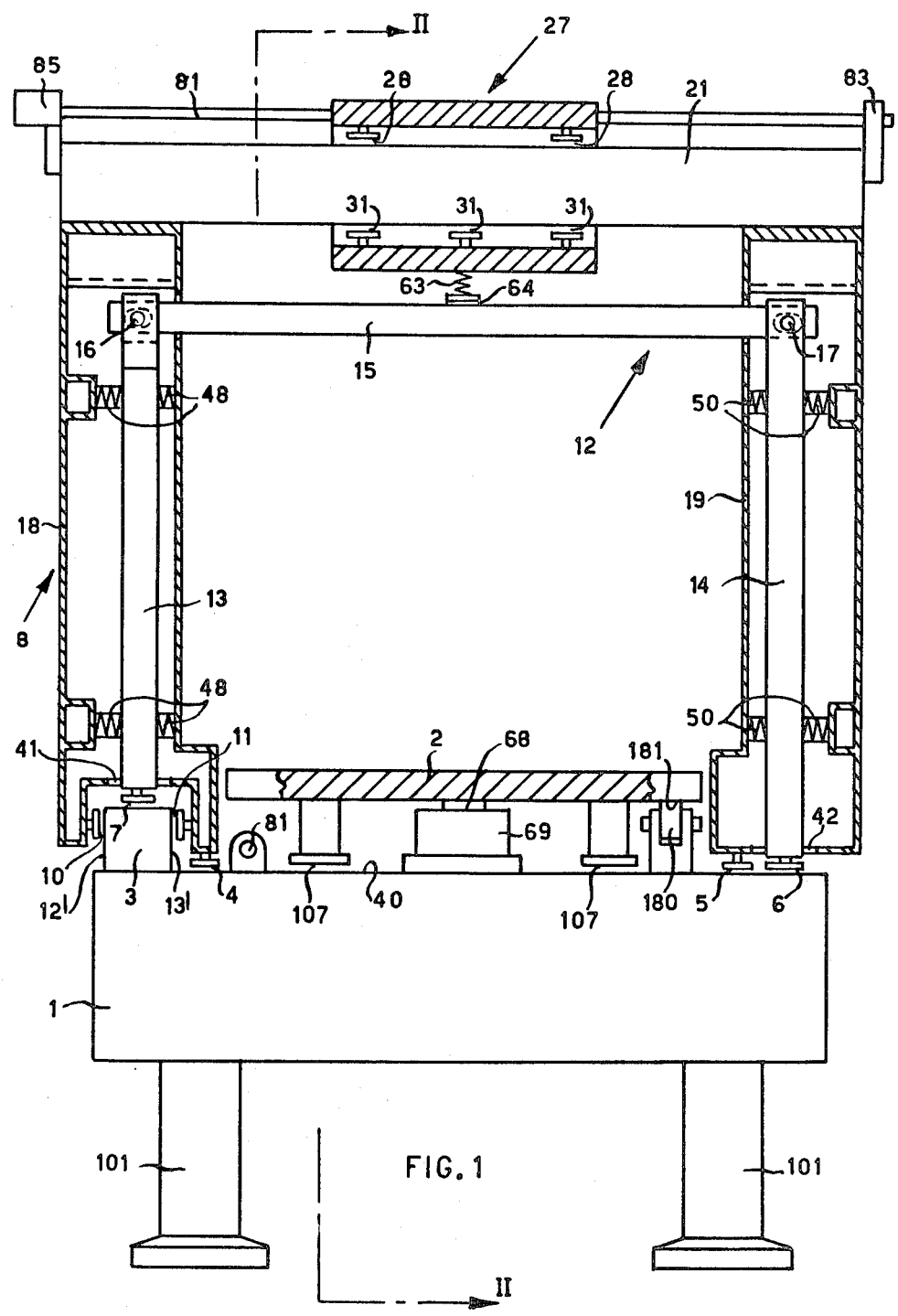
FIG. 1 is a front view, partly in section, of a precision measuring apparatus embodying the invention.

Referring to FIG. 1, the dimension measuring apparatus comprises a horizontal platform 1 of diabase supported by six steel columns 101 and bearing a rotary steel workpiece table 2 and a prismatic precision guide 3 also of diabase. The workpiece table 2 rests on the upper surface 40 of the platform 1 via a series of air bearings 107 (FIG. 3) known per se. Under the table 2 there is fixed a pivot 68 rotatable in a bush 69 fast with the platform 1. The pivot can also move slightly axially in the bush 69 as required by the air bearing support system.

The measuring apparatus comprises a portal 8 (FIG. 1) constituted by two uprights 18, 19 of sheet steel in box form interconnected at the top by a cross-piece constituted by a parallelepipedal guide beam 21 of diabase along which a carriage 27 is slidable. The portal 8 is translatable on the platform 1 in the direction X parallel to the guide 3. More particularly, the upright 18 slides on the surface 40 of the platform 1 by means of two air bearings 4 and on two opposite vertical faces 12' and 13' of the guide 3 by means of two pairs of air bearings 10 and 11. The upright 19 slides on the surface 40 of the platform 1 by means of two air bearings 5 (FIG. 2).

The beam 21 (FIG. 2) has two horizontal faces 22 and two vertical faces 23 which guide the carriage 27 by means of a series of air bearings 28, 31 and 33. The carriage 27 can therefore translate in the direction Y, coinciding with the direction of the longitudinal axis of the beam 21.

The carriage 27 is constituted by a hollow structure of sheet steel in box form, through which the beam 21 passes. Slidable in the vertical direction Z in a measuring head 34 fast with the carriage 27 is a parallelepipedal bar 38 of diabase, at the lower end of which a sensor or feeler 39 for the measurements of the workpiece is mounted by means of a holder (not shown).

The machine comprises a compensating portal 12 (FIG. 1) accommodated inside the measuring portal 8 and formed by two steel columns 13, 14 connected at the top to a beam 15 also of steel and of parallelepipedal form by means of two connecting elements 16 and 17 indicated diagrammatically and adapted to allow a certain sliding between the ends of the beam 15 and the columns 13 and 14. At the bottom, the columns 13, 14 emerge from the structure of the portal 8 through two windows 41, 42 in the bottom of the bases of the uprights 18 and 19 of the portal 8. Through these windows 41 and 42, the columns 13 and 14 rest on the upper face of the guide 3 and on the surface 40 of the platform 1 by means of two air bearings 7 and 6, respectively. The columns of the compensating portal 12 are stabilized vertically within the uprights 18 and 19 by means of a series of pairs of resiliently yielding connecting elements opposed two by two transversely (Y axis) in the case of elements 48, 50 and longitudinally (X axis) in the case of elements 60 (FIG. 2). These elements are constituted by compression springs, as indicated diagrammatically in FIGS. 1 and 2, but may also be constituted by blocks of resilient or yielding material, for example rubber.

Each pair of the said elements, for example the elements 48 (FIG. 1), allows a bidirectional resilient yielding action along the corresponding axis. In this way, each pair of resiliently yielding elements, for example 48, constitutes a non-rigid bilateral link located between the portal 8 and the portal 12. The group of the non-rigid bilateral links causes the portal 12 to be carried along in translation by the portal 8 when the latter translates along the guide 3.

The carriage 27 rests on the beam 15 of the portal 12 via a bearing element constituted by a compression spring 63 and an air bearing 64. More particularly, in a hole in a portion 207 (FIG. 6) of the carriage 27 there is welded a bush 203 having a threaded hole into which is screwed an externally threaded sleeve 201. A cylindrical core 204 is slidable in a bush 206 fixed in a corresponding cylindrical seat in the sleeve 201. The spring 63 is disposed between a flange 209 of the core 204 and a shoulder 211 of the sleeve 201. An abutment nut 212 screwed on to a threaded stud of the core 204 limits the stroke of the core 204 in the direction of the thrust of the spring 63.

The core 204 has at the bottom a hole 216 flared to form a conical seat 214. On the sliding block of the air bearing 64, which rests on the beam 15 of the portal 12, there is rigidly mounted a spherical cap 221 co-operating with the conical seat 214. The cap 221 terminates at the top in a stem 222 provided with a retaining head inserted in the hole 216.

During the operation of the machine, the carriage 27 (FIG. 1) tends to sag owing to its own weight and of that of the measuring head 34. The portion 207 (FIG. 6) and the sleeve 201 fast therewith thus also move downwardly and the shoulder 211 tends to compress the spring 63 against the flange 209 of the core 204. This is also urged downwardly, so that the conical seat 214 engages against the spherical cap 221, pressing it downwardly in turn. The sliding block of the bearing 64 is also pressed downwardly and transmits a downward stress to the upper surface of the beam 15. This stress is equal to the greatest part, up to 98%, of the weight to be compensated, that is the weight of the carriage 27 (FIG. 1) and of the measuring head 34, which is about 70 kg. The residual part of the weight to be compensated is supported directly by the cross-piece 21 of the portal 8. In view of the smallness of this residual part, the cross-piece 21 and the portal 8 are not appreciably stressed.

The double portal structure 8 and 12 therefore allows the weight of the movable equipment 27, 34 to be unloaded almost completely on to the beam 15 of the compensating portal 12 via the spring 63 and the pneumostatic bearing 64. The fraction of this weight which still loads the guide beam 21 is very small, practically speaking of the order of 2 to 5%, and does not cause any appreciable deflection either of the beam 21 itself or of the upright 18, 19. Moreover, the total weight with which the measuring portal 8 bears on the platform 1 is practically independent of the aforesaid weight of the movable equipment, so that the vertical reaction forces supplied by the supporting air bearings 4 and 5 of the portal 8 itself are also independent of this weight. Therefore, on variation of the position of the carriage 27 along the axis Y, these reaction forces remain practically constant, so that it is not necessary to vary the pressure of the fluid in the passage of the pneumostatic bearings 4 and 5. Consequently, the distance between the sliding block and the guide in the bearing itself, that is the height of the passage, does not vary. This ensures the constancy of the geometrical reference offered by the guide beam 21 and therefore ensures everywhere perfect angular orientation of the carriage 27 and, therefore, of the measuring head 34 and the axis Z, thus securing a drastic reduction in measuring errors.

Figure 3:
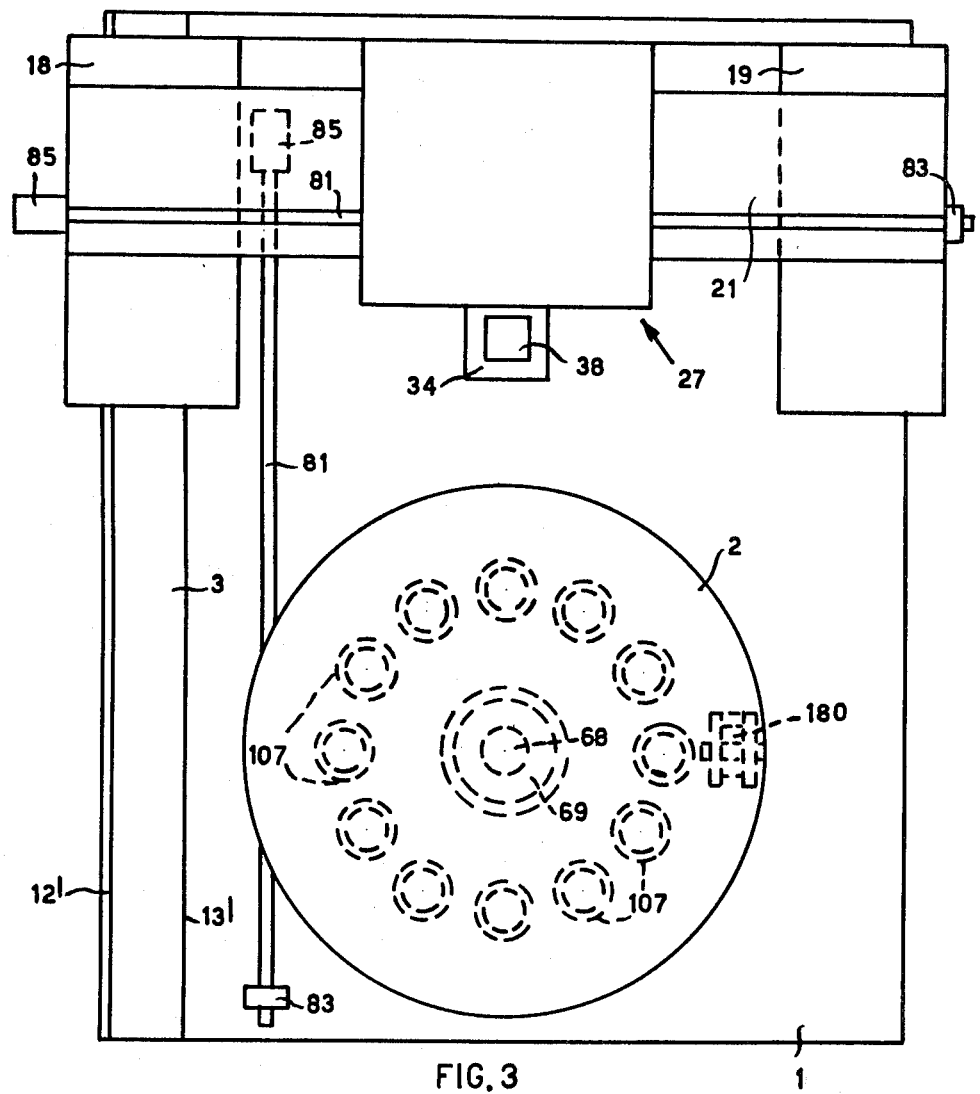
FIG. 3 is a plan view of the measuring apparatus of FIG. 1.

FIG. 4 illustrates diagrammatically, on an exaggerated scale, the deformation of the portal 12 of FIGS. 1 to 3, wherein the beam 15 is connected substantially rigidly to the columns 13 and 14. It is obvious how the bending of the beam 15 produces an inclination of the columns 13 and 14 which is opposed by the resiliently yielding elements 48 and 50 between the columns 13 and 14 and the uprights 18 and 19. This entails the transmission of horizontal stresses applied to the uprights 18 and 19 of the portal 8, to which there corresponds a small deformation.

According to another embodiment of the invention, instead of the connection between the lintel 15 of the portal 12 and the corresponding columns 13 and 14 being substantially rigid, it is achieved by means of two bearings, as shown diagrammatically in FIG. 5. More particularly, each of the columns 13 and 14 is provided at the top with a seat 217, 218, respectively, in which a roller 219, 220 disposed with its axis parallel to the axis X can roll, so that the beam 15 is simply supported on these two rollers 219 and 220. In this way, the beam 15 unloads simply a vertical force on to each of the columns 13 and 14. Each of the columns 13 and 14 then behaves as a simple strut subject to compression and therefore the deformations in the attitude of the portal due to the inclination of the columns 13 and 14 do not occur.

The equipment movable along the axis Z comprises a part including the bar 38 having a constant weight and a part including the feeler 39 having a variable weight. In order to allow adjustable compensation of these weights, the measuring head 34 bears a vertical cylinder 159 (FIG. 7) in which there is vertically slidable a vertical pneumatic piston 160 closed at the top by a cover 161. This presses by means of a half-sphere 162 against a plate 163 fixed on a stem 164 fast with the bar 38.

From an inlet pipe 165 and via an adjustable throttle valve 166, the compressed air enters a pressure regulating valve 167 and an inlet 168 for the air at regulated pressure into the cylinder 159.

After mounting the feeler 39 on the bar 38, supporting the weight thereof with one hand, the throttle valve 166 is adjusted so as to balance the weight until the bar 38 is in unaffected equilibrium. The regulating valve 167 ensures the constancy of the value of the pressure in the cylinder 159 and, therefore, the constancy of the force applied by the piston 160 against the plate 163. According as the throttle valve 166 is closed or opened, the pressure on the piston 160 falls or rises. Correspondingly, the force transmitted by the half-sphere 162 to the plate 163 decreases or increases. When equilibrium has been reached, this force is equal to the weight of the assembly constituted by the feeler 39 and the bar 38.

The pressure regulating valve 167 maintains the pressure of the air on the piston 160 constant both under static conditions, when the axis Z is stationary, and under dynamic conditions, when the axis Z is shifted rapidly and there is a considerable variation in the volume of air contained in the cylinder 159. However, if the compressed air should fail because of damage or breakdown, the weight of the bar 38 and of the feeler 39 would no longer be supported. For this contingency there is provided a safety device comprisng a drilled collar 169 in which the piston 160 slides with a certain clearance. The collar 169 is hinged on a transverse pin 170 fixed to a portion 175 of the head 34 and is normally held horizontal in opposition to the action of a spring 179 by a plunger 171 actuated by compressed air. The plunger is slidable in a cylinder 172 fixed to the cylinder 159. The thrust of the plunger 171 is transmitted to the collar 169 by means of a spherical cap 173. A screw 174 screwed into the portion 175 which is fast with the cylinder 159 arrests the collar 169, pushed by the plunger 171, in an adjustable position. The compressed air reaches the interior of the cylinder 172 through the conduit 176.

If the compressed air fails, the plunger 171 no longer supports the collar 169 which, owing to the effect of its own weight and of the spring 179, turns about the pin 170 until the piston 160 jams in the collar and blocks the vertical falling movement of the corresponding bar 38.

Figure 8:
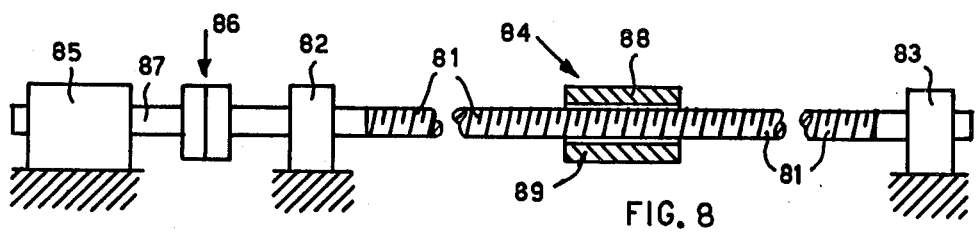
FIG. 8 is a diagrammatic section of a mechanism of the measuring apparatus.

It is to be noted that the precision positioning of the feeler 39 over the point to be detected comprises a coarse adjustment carried out manually, which brings the feeler into the vicinity of the final position, and a fine or micrometric adjustment, which brings the feeler exactly into the final position. The fine positioning is effected by means of a mechanism for the micrometric movement, for example of the stepping motor type. This mechanism is identical for the two linear axes X and Y and is illustrated diagrammatically in FIG. 8. It comprises a stepping motor 85, the shaft 87 of which drives, through an Oldham coupling 86, a screw 81 mounted in two supports 82 and 83 and coupled to a lead nut 84 fast with the movable part of the corresponding axis. The motor 85 of the stepping type is commanded, in manner known per se, by means of electrical pulses generated by a suitable electric circuit not shown in the drawings. At each pulse that is received, the motor rotates through a constant angle, called a step, to which there corresponds a predetermined advance of the lead nut 84. The speed of the motor 85 is therefore proportional to the frequency of the electrical pulses.

During the micrometric movements of the axis, the lead nut 84 must obviously be coupled to the control screw 81. However, since the irreversible coupling of screw and lead nut would prevent coarse positioning movements of the axis carried out by hand, the coupling of the screw and lead nut is effected only when the micrometric movements are to be made. To this end, the lead nut 84 is constituted by two parts 88 and 89 (FIG. 9) fast with two metal blocks 90 and 91, respectively.

These blocks are interconnected by a tie rod 92 passing through two holes 93 and 94 formed in the blocks themselves, and by a pre-loaded spring 95 mounted coaxially on the tie rod 92 and compressed between the block 91 and a nut 98 screwed on to the threaded end of the tie rod 92. In the absence of other forces, the action of the spring 95 is sufficient to maintain the two parts 88 and 89 of the lead nut 84 in engagement with the screw 81.

In a cylinder 150 fast with the block 90 there is slidable a piston 151 adapted to bear via a ball 153 against the upper surface of the metal block 91. The axis of the cylinder 150 is parallel to that of the tie rod 92. The piston 151 is provided with a rod 157 having a duct 155 connected through an electric valve, not shown in the drawings, to the compressed air supply.

When the electric valve is deactivated, the compressed air, acting through the duct 155 and then through a hole 156, urges the piston 151 towards the block 91. The force exerted on the block 91 is sufficient to overcome that provided by the compression of the spring 95 and is therefore able to move the two blocks 90 and 91 away from each other, together with the two parts 88 and 89 of the lead nut 84, so that this disengages the screw 81 for allowing manual movements.

On the other hand, when the electric valve is activated, the influx of compressed air is blocked and the pressure on the piston 151 is lacking, whereby the force applied to the block 91 is nullified and the action of the spring 95 keeps the lead nut 84 closed on the screw 81 for allowing the relevant micrometric movement.

For the axis of rotation C, the micrometric movement mechanism comprises a stepping motor (not shown) which rotates a roller 180 (FIG. 1) which rolls on the undersurface 181 of the rotary table 2 without slipping and transmits the rotary motion thereto by friction.

What I claim is:

1. A precision measuring apparatus having a measuring head, a portal mounted to translate on a platform, comprising a pair of uprights, a first cross-piece supported by said uprights, a carriage bearing said measuring head, and running on said cross-piece, a second cross-piece parallel to the first cross-piece and movable with it, and resilient means for unloading the weight of said carriage on said second cross-piece, wherein the improvement comprises a second portal including said second cross-piece, a pair of columns, said second cross-piece being disposed below said first cross-piece, said uprights being hollow and housing inside each one the corresponding one of said columns, and a series of resiliently yielding bilateral links ensuring the carrying along of the second portal by the first portal.

2. Apparatus according to cliam 1, wherein the resilient links are constituted by opposed pairs of compression springs disposed between each column and the corresponding upright.

3. Apparatus according to claim 1, wherein the said resilient means comprise a resilient mount, one of the two ends of which is connected rigidly to the carriage, while the other is connected through a kinematic coupling to a sliding block forming an air bearing with the second cross-piece.

4. Apparatus according to claim 3, wherein the resilient mount comprises a sleeve fast with the carriage, a member coaxial with the said sleeve and connected to the said kinematic coupling, and a preloaded spring compressed between the number and the sleeve.

5. Apparatus according to claim 4, wherein the said member includes a core within said sleeve, kinematic coupling including a ball joint adapted to allow a certain movement parallel to said core.

6. Apparatus according to claim 1, wherein said second cross-piece rests on top of the said columns at its ends, including at least one supporting roller having a horizontal axis substantially perpendicular to the longitudinal axes of said cross-piece.

7. Apparatus according to claim 1, further comprising fluodynamic means adjustable to compensate on the carriage the weight of the movable equipment of the measuring head, and a safety device conditionable for supporting said movable equipment when the said fluodynamic means are inactive.

8. Apparatus according to claim 7, wherein the safety device comprises a collar pivoted on an axis transverse with respect to the axis of the collar, the said movable equipment being slidable with a clearance in the collar, the said fluodynamic means including supporting means for keeping the collar in a position maintaining the said clearance, whereby a drop in pressure in the said fluodynamic means produces a tilting movement of the collar and the jamming of the said movable equipment in the collar.

9. Apparatus according to claim 1, wherein the movement of the measuring head respect to the workpiece is effected through a screw and lead nut drive, and wherein the lead nut is in two parts each one carried by a corresponding support, further comprising means for movably mounting said supports so as to cause said two nut parts to be moved in opposite directions, a fluodynamic cylinder operable under manual control to move said supports from each other to disengage said nut parts from said screw, and an elastic link connecting said supports for causing said nut parts to yieldably engage said screw when said cylinder is not operated.

* * * * *

UNITED STATES PATENT AND TRADEMARK OFFICE
CERTIFICATE OF CORRECTION

PATENT NO. : 4,138,822
DATED : February 13, 1979
INVENTOR(S) : MARIO PARODI

It is certified that error appears in the above-identified patent and that said Letters Patent are hereby corrected as shown below:

On the front page of the patent, change Assignee "Ing. C. Olivetti & C., S.p.A." to -- Olivetti Controllo Numerico S.p.A. --

*Signed and Sealed this*

*Thirty-first* Day of *July 1979*

[SEAL]

*Attest:*

LUTRELLE F. PARKER
*Attesting Officer*     *Acting Commissioner of Patents and Trademarks*